United States Patent
Qi et al.

(10) Patent No.: US 11,673,987 B2
(45) Date of Patent: Jun. 13, 2023

(54) ONE METHOD OF PRODUCING POLYETHER POLYMER DISPERSANT AND POLYETHER POLYMER

(71) Applicants: Weixin Qi, Jiangsu (CN); Baocheng Zhao, Jiangsu (CN); Yong Han, Jiangsu (CN); Bing Hu, Jiangsu (CN); Suling Wei, Jiangsu (CN)

(72) Inventors: Weixin Qi, Jiangsu (CN); Baocheng Zhao, Jiangsu (CN); Yong Han, Jiangsu (CN); Bing Hu, Jiangsu (CN); Suling Wei, Jiangsu (CN)

(73) Assignee: Huaian Bud Polyurethane Science & Technology Co., Ltd, Huaian (CN)

( * ) Notice: Subject to any disclaimer, the term of this patent is extended or adjusted under 35 U.S.C. 154(b) by 786 days.

(21) Appl. No.: 16/746,876

(22) Filed: Jan. 19, 2020

(65) Prior Publication Data

US 2021/0087318 A1   Mar. 25, 2021

(51) Int. Cl.
| | |
|---|---|
| *C08F 283/06* | (2006.01) |
| *C08F 2/38* | (2006.01) |
| *C08F 290/04* | (2006.01) |
| *C08G 18/48* | (2006.01) |
| *C08G 18/63* | (2006.01) |
| *C08L 71/02* | (2006.01) |
| *C08K 5/1539* | (2006.01) |
| *C08K 5/23* | (2006.01) |

(52) U.S. Cl.
CPC ........... *C08F 283/06* (2013.01); *C08F 2/38* (2013.01); *C08F 290/044* (2013.01); *C08G 18/4841* (2013.01); *C08G 18/636* (2013.01); *C08L 71/02* (2013.01); *C08K 5/1539* (2013.01); *C08K 5/23* (2013.01)

(58) Field of Classification Search
None
See application file for complete search history.

(56) References Cited

U.S. PATENT DOCUMENTS

| | | | | |
|---|---|---|---|---|
| 4,652,589 A | * | 3/1987 | Simroth | C08F 283/06 521/137 |
| 6,403,667 B1 | * | 6/2002 | Eleveld | C08G 18/635 525/445 |
| 2006/0025491 A1 | * | 2/2006 | Adkins | C08F 283/06 521/155 |
| 2015/0274952 A1 | * | 10/2015 | Borella | C08L 25/12 521/137 |

FOREIGN PATENT DOCUMENTS

| | | | | |
|---|---|---|---|---|
| WO | WO-9940144 A1 | * | 8/1999 | .......... C08F 290/061 |
| WO | WO-2014055282 A1 | * | 4/2014 | .......... C08G 18/4072 |

* cited by examiner

*Primary Examiner* — Christopher M Rodd

(57) ABSTRACT

The invention discloses one method of producing polyether polymer dispersant and polyether polymer, wherein the dispersant is a copolymer macromolecule prepared by the propylene oxide or ethylene oxide with an average molecular weight of 6000 to 20000, with containing at least one benzene ring group and one polymerizable carbon-carbon double or triple bond polymer. The preparation method of the dispersant is: synthesizing a basic polyether polyol, adding a cyclic dicarboxylic anhydride into the polyether polyol, then the polyether polyol is reacted with an epoxy compound with the polymerizable double bond, and capping with an epoxy compound to obtain the dispersant; preparing the polymer polyol by the basic polyol, an unsaturated vinyl monomer styrene and acrylonitrile, a polymerization initiator, the dispersant and an optional chain transfer agent; the basic polyether is a polyether polyol with a functionality of 3 to 8.

6 Claims, No Drawings

ONE METHOD OF PRODUCING POLYETHER POLYMER DISPERSANT AND POLYETHER POLYMER

BACKGROUND OF THE INVENTION

1. Field of the Invention

The invention relates to the technical field of preparation or chemical processing of an organic polymer compound, and in particular to a dispersant for polymer polyol and a preparation method of polymer polyol.

2. Description of the Related Art

The polymer polyol (POP) is a graft polyether polyol containing solid particles formed by the in-situ polymerization of an alkenyl group-containing monomer via a radical initiator based on the polyether polyol. The polyol contains hydroxyl groups, and the fine particles formed by the polymer with styrene or acrylonitrile in the side chain can be used for foaming polyurethane and making the foam have better load bearing property, and is mainly used as the raw material for manufacturing high resilience soft foam. The addition of the POP to the formulation of the foam improves the load bearing property of the foam and improves the processing of the particle reinforcement; the dispersedly filled polymer ultrafine particles act as an active filler for the polyurethane matrix, and can improve the modulus, tensile strength, tear strength, hardness and the like of the PU foam. It is mainly used in the aircraft and automotive industry, upholstered furniture, shoe materials and craft products.

Stability is an important feature in POPs; styrene and acrylonitrile are polymerized in free radical polymerization at moderate temperatures and pressures, and are readily polymerized in the liquid polyol phase. Although styrene homopolymer particles can be formed in the polyol phase, the obtained POP tends to have poor stability. At this time, the action of the dispersant for POP is crucial, and if the dispersant is unstable, the partially dispersed polymer phase may precipitate. The dispersant contains a soluble group of a polyol which is a typical polyether chain, and is considered to be used for the interaction with a continuous polyol phase to stabilize the particles. A common class of stabilizers is macromonomer compound in which one or more hydroxyl groups are blocked by a group containing a polymerizable unsaturation; such stabilizer is copolymerized with styrene and acrylonitrile, and the polyol soluble portion is added onto the copolymer particles. Macromolecules of this type and preformed stabilizers are described in the literature related to POPs. For example: in the patent U.S. Pat. No. 4,652,589, a polyether polyol with a molecular weight of 12000 prepared by polymerizing sorbitol as an initiator with propylene oxide (PO) or ethylene oxide (EO) is disclosed, which is then reacted with maleic anhydride to add a double bond and then capped with EO to form a macromonomer; however, such macromonomers are dark in color, mostly dark yellow, and have a large viscosity, which is inconvenient to use. In the patent WO 1999040144, after the sorbitol is reacted with phthalic anhydride, it is reacted with glycidyl methacrylate to form a macromonomer; the macromonomer synthesized by the method has a lower viscosity, but the synthesized POP has a higher viscosity and the particles are general; In the patent WO 2014055282, the polyether polyol with a molecular weight of 12000 prepared by polymerization of PO and EO with sorbitol initiator is coupled with 3-isopropenyl-α, α-dimethylbenzyl isocyanate (TMI) to form macromonomer, and in the patent US20060025491, the polyether polyol with a molecular weight of 12000 prepared by polymerization of PO and EO with MDI is coupled with 3-isopropenyl-α, α-dimethylbenzyl isocyanate (TMI) to form macromonomer, and a two-period continuous reaction is used to prepare a pre-formed stabilizer for synthesizing POPs; the macromonomer synthesized by the method has a relatively low viscosity, good color, and the viscosity of the synthetic POP is general, and the macromonomer is turbid, which is prone to self-polymerization.

During the continuous experiment, the applicant unexpectedly discovered that a stable, colorless and transparent dispersant can be obtained by selecting a specific unsaturated compound and then capping with a specific cap, and the POP prepared therefrom has not only a relatively low viscosity, but also fine particles, high whiteness and good water solubility.

SUMMARY OF THE INVENTION

In order to solve the technical issues above, the invention provides a dispersant for polymer polyol and a preparation method of polymer polyol. The invention is realized by the following technical solutions.

A dispersant for polymer polyol, wherein the dispersant is a copolymer macromolecule with a weight percentage of 50%-90% of propylene oxide and 0%-20% of ethylene oxide, respectively; the macromolecule has an average molecular weight from 6000 to 20000, with containing at least one benzene ring group and one polymerizable carbon-carbon double or triple bond polymer; the average molecular weight is the average of molecular weights.

A preparation method of the dispersant for polymer polyol and a preparation method of polymer polyol, wherein the preparation method of the dispersant is: synthesizing a basic polyether polyol, adding a cyclic dicarboxylic anhydride into the polyether polyol, then the polyether polyol is reacted with an epoxy compound with the polymerizable double bond, and capping with an epoxy compound to obtain the dispersant; preparing the polymer polyol at a temperature of 100-130° C. by the basic polyol, an unsaturated vinyl monomer styrene and acrylonitrile, a polymerization initiator, the dispersant and an optional chain transfer agent; the basic polyether is a polyether polyol with a functionality of 3 to 8; the propylene oxide and ethylene oxide are block polymerized, wherein the content of ethylene oxide is 0-50%, and the molecular weight thereof is 5000-20000.

Further, the initiator of polyether polyol is ethylene glycol, trimethylolpropane, tripropylene glycol, diethylene glycol, glycerin, pentaerythritol, xylitol, sorbitol, sucrose, etc., preferably glycerin, pentaerythritol and sorbitol; the catalyst used for the synthesis of polyether polyol is a potassium hydroxide and bimetallic catalyst.

Further, the cyclic dicarboxylic anhydride added in the dispersant is maleic anhydride, phthalic anhydride, fumaric acid, etc., preferably phthalic anhydride; the mole number of cyclic dicarboxylic anhydride is 0.2-2.0 mol, preferably 0.8-1.5 mol.

Further, the polymerizable double bond compound is glycidyl methacrylate, methyl methacrylate, allyl glycidyl ether, hydroxypropyl acrylate, methacrylic acid and hydroxyethyl methacrylate, 3-isopropenyl-α, α-dimethylbenzyl isocyanate, preferably glycidyl methacrylate, allyl glycidyl ether and 3-isopropenyl-α, α-dimethylbenzyl isocyanate.

Further, the capping epoxy olefin is selected from one of propylene oxide, ethylene oxide, and butylene oxide.

Further, the polymerization initiator is an azo compound or a peroxide; the azo compound is azodiisobutyronitrile (AIBN), and the weight of the polymerization initiator accounts for 0.3-0.7% of the total weight of adding.

Further, the chain transfer agent is isopropanol, dodecyl mercaptan, ethanol, methanol, cyclohexane, toluene, ethylbenzene, tert-butanol, etc., preferably isopropanol, and the weight of the chain transfer agent accounts for 1-10% of the total weight of adding.

Further, the vinyl monomer is styrene and acrylonitrile with a weight ratio of 80:20-20:80, and the weight of the vinyl monomer accounts for 30-60% of the total weight of adding.

Further, the invention further relates to a polymer polyol prepared by the invention, preferably a polymer polyol without by-products.

Advantageous Effects of the Invention

A stable, colorless and transparent dispersant can be obtained in the invention by selecting a specific unsaturated compound and then capping with a specific cap, and the POP prepared therefrom has not only a relatively low viscosity, but also fine particles, high whiteness and good water solubility.

DETAILED DESCRIPTION OF THE PREFERRED EMBODIMENTS

The technical solutions of the invention will be described in more detail hereinafter with reference to the specific embodiments.

Embodiment 1: Synthesis of the Dispersant for POP

Preparation of Polyether Polyol A1

Adding potassium hydroxide into glycerin with a molecular weight of 92 g/mol, adding propylene oxide to polymerize at a temperature of 115° C., capping with 15 wt % of ethylene oxide to produce trifunctional polyether polyol with a molecular weight of 6000 g/mol; the product is added with water, neutralized with phosphoric acid, adsorbed with refining agent and carclazyte, and filtered to obtain the final product A1, with a hydroxyl value of 28 mgKOH/g.

Preparation of Polyether Polyol A2

Adding potassium hydroxide into pentaerythritol with a molecular weight of 136 g/mol, adding the 85/15 mixture of propylene oxide and ethylene oxide to polymerize at a temperature of 115° C. to produce tetrafunctional polyether polyol with a molecular weight of 8000 g/mol; the product is added with water, neutralized with phosphoric acid, adsorbed with refining agent and carclazyte, and filtered to obtain the final product A2, with a hydroxyl value of 28 mgKOH/g.

Preparation of Polyether Polyol A3

Adding potassium hydroxide into sorbitol with a molecular weight of 182.17 g/mol, adding propylene oxide to polymerize at a temperature of 115° C. to produce hexafunctional polyether polyol with a hydroxyl value of 210 mgKOH/g; the product is added with water, neutralized with phosphoric acid, adsorbed with refining agent and carclazyte, and filtered to obtain the final product; adding 50 ppm of bimetallic catalyst (Cobalt-zinc double metal cyanide complex catalyst) to the product, and adding the 85/15 mixture of propylene oxide and ethylene oxide to polymerize at a temperature of 130° C. to produce hexafunctional polyether polyol A3, with a molecular weight of 12000 g/mol and a hydroxyl value of 28 mgKOH/g.

Embodiment B1: Preparation of the Dispersant for POP

Adding a small amount of potassium hydroxide and polyether polyol A1 to the reaction vessel; heating to 110° C. under a low pressure of −0.1 MPa to dehydrate for 1 hour; lowering the temperature to 80° C.; adding phthalic anhydride (PA) into the reaction vessel; replacing the reaction vessel with nitrogen; heating to 110° C. under the protection of nitrogen; after the temperature is raised to 110° C., adding glycidyl methacrylate (GMA) and 3-isopropenyl-α, α-dimethylbenzyl isocyanate (TMI) into the reaction vessel at this temperature for 4 h, then adding propylene oxide into the reaction vessel and terminating the reaction when the acid value is less than 0.5 mgKOH/g; the obtained product is a colorless and transparent liquid, with a viscosity of 1550 cps/25° C. and an acid value of 0.26 mgKOH/g.

Embodiments B2-B3

Preparing the dispersant for POP in the same way as in Embodiment B1, but replacing the polyether polyol A1 with A2 and A3, as shown in Table 1.

Embodiment B4

Preparing the dispersant for POP in the same way as in Embodiment B3, but replacing the glycidyl methacrylate (GMA) with allyl glycidyl ether (AGE), as shown in Table 1.

Embodiments B5-B6

Preparing the dispersant for POP in the same way as in Embodiment B3, but changing the amounts of GMA and AGE, as shown in Table 1.

TABLE 1

| | | | | | | | | | | | |
|---|---|---|---|---|---|---|---|---|---|---|---|
| Embodiments for the Synthesis of Dispersant for POP | | | | | | | | | | | |
| Embodiments | Polyether Polyol | Polyether Polyol (g) | KOH (g) | PA (g) | GMA (g) | AGE (g) | TMI (g) | PO (g) | Appearance | Acid Value | Viscosity |
| B1 | A1 | 1000 | 0.15 | 23.7 | 24.7 | / | 16.7 | 24.7 | Colorless and Transparent | 0.26 | 1550 |
| B2 | A2 | 1000 | 0.15 | 17.7 | 18.5 | / | 12.5 | 18.5 | Colorless and Transparent | 0.31 | 1630 |

TABLE 1-continued

Embodiments for the Synthesis of Dispersant for POP

| Embodiments | Polyether Polyol | Polyether Polyol (g) | KOH (g) | PA (g) | GMA (g) | AGE (g) | TMI (g) | PO (g) | Appearance | Acid Value | Viscosity |
|---|---|---|---|---|---|---|---|---|---|---|---|
| B3 | A3 | 1000 | 0.15 | 11.8 | 12.3 | / | 8.4 | 12.3 | Colorless and Transparent | 0.16 | 1760 |
| B4 | A3 | 1000 | 0.15 | 11.8 | / | 9.5 | 8.4 | 9.5 | Yellowish and Transparent | 0.35 | 1650 |
| B5 | A3 | 1000 | 0.15 | 11.8 | 17.2 | / | 11.7 | 17.2 | Colorless and Transparent | 0.29 | 1890 |
| B6 | A3 | 1000 | 0.15 | 11.8 | 12.3 | / | 0 | 12.3 | Yellowish and Slight Turbid | 0.33 | 1660 |

Comparative Embodiment (Synthesis of Dispersant for POP; Dispersant E)

For comparison with the invention, preparing the macromonomers according to the method of patent WO2014055282.

Preparing the polyol with an OH number of 28 by reacting the sorbitol with an OH functionality of 6 with the propylene oxide and ethylene oxide (12 wt %); adding 0.55 moles of 3-isopropenyl-α, α-dimethylbenzyl isocyanate (TMI), then adding a very small amount of tin catalyst, and terminating the reaction after 120 minutes of mixing. The product has a viscosity of 1620 cps/25° C., a viscosity of 5310 cps/25° C. after 72 hours, a poor stability, and an appearance of colorless and turbidity.

It can be seen from the above comparative analysis that the dispersant prepared by the preparation method of the invention has a similar viscosity when compared with the comparative embodiment, but the dispersant prepared by the invention has high transparency without changes after a long-term storage, and is stable.

Embodiment 2: Preparation of Common POP (SP.1)

Adding 188.8 g of polyol (polyether polyol B with a hydroxyl value of 56.1 mgKOH/g and a functionality of 3) into a 2 liter reactor equipped with a reflux condenser and a stirrer, heating to 120° C. under the protection of nitrogen; when the temperature in the reactor is maintained at 120-125° C., continuously adding the monomer mixture (423.2 g of polyol B, 7.2 g of AIBN, 162 g of acrylonitrile, 378 g of styrene, 48 g of dispersant B 1, and 96 g of isopropanol) into the reactor over 90 minutes. After the addition of the monomer mixture is completed, aging the reaction for 60 minutes, and after the age, degassing under a vacuum of −0.1 MPa for 2 hours to remove unreacted monomers and isopropyl alcohol. The solid content is 44.1%.

Embodiments 3-7: Preparation of Common POP (SP.2-6)

Preparing the POP in the same way as in Embodiment 2, but the type of dispersant applied is varied, as shown in Table 2.

Embodiment 8: Preparation of High-Activity POP (SP.7)

Adding 166.6 g of polyol (polyether polyol c with a hydroxyl value of 34 mgKOH/g and a functionality of 3, and is capped with 15 wt % of ethylene oxide) into a 2 liter reactor equipped with a reflux condenser and a stirrer, heating to 120° C. under the protection of nitrogen; when the temperature in the reactor is maintained at 120-125° C., continuously adding the monomer mixture (373.4 g of polyol C, 6 g of AIBN, 140 g of acrylonitrile, 280 g of styrene, 45.4 g of dispersant B1, and 80 g of isopropanol) into the reactor over 90 minutes. After the addition of the monomer mixture is completed, aging the reaction for 60 minutes, and after the age, degassing under a vacuum of −0.1 MPa for 2 hours to remove unreacted monomers and isopropyl alcohol. The solid content is 40.6%.

Embodiments 9-13: Preparation of High-Activity POP (SP.8-12)

Preparing the POP in the same way as in Embodiment 8, but the type of dispersant applied is varied, as shown in Table 3.

Comparative Embodiments 2 and 3: preparation of POP: for comparison with the invention, preparing the POP in the same way as in Embodiment 2 and Embodiment 8, but the dispersant used is dispersant E in Comparative Embodiment 1, as shown in Table 2.

TABLE 2

Embodiments of the Preparation of Common POP

| Embodiments | SP1 | SP2 | SP3 | SP4 | SP5 | SP6 | Comparative Embodiment 2 |
|---|---|---|---|---|---|---|---|
| Polyol B (g) | 306 | 306 | 306 | 306 | 306 | 306 | 306 |
| Type of Dispersant | B1 | B2 | B3 | B4 | B5 | B6 | Dispersant E |
| Amount of Dispersant (g) | 24 | 24 | 24 | 24 | 24 | 24 | 24 |

TABLE 2-continued

Embodiments of the Preparation of Common POP

| Embodiments | SP1 | SP2 | SP3 | SP4 | SP5 | SP6 | Comparative Embodiment 2 |
|---|---|---|---|---|---|---|---|
| Isopropanol (g) | 48 | 48 | 48 | 48 | 48 | 48 | 48 |
| Styrene (g) | 181 | 181 | 181 | 181 | 181 | 181 | 181 |
| Acrylonitrile (g) | 89 | 89 | 89 | 89 | 89 | 89 | 89 |
| AIBN (g) | 3.6 | 3.6 | 3.6 | 3.6 | 3.6 | 3.6 | 3.6 |
| Solid Content (%) | 44.1 | 44.2 | 44.5 | 44.0 | 44.7 | 44.3 | 44.1 |
| Viscosity (cps/25° C.) | 5430 | 5290 | 4880 | 5370 | 4650 | 6870 | 5960 |
| Particles | A Few and Large | Fine | Fine | Large | Fine | Large | Large |
| Color and Luster | White | White | White | Milky White | White | Milky White | Milky White |
| Viscosity after Water-Solution (cps/25° C.) | 5720 | 5500 | 5260 | 5940 | 4850 | 7960 | 7510 |

Note: water-solution test: taking 100 g of POP in a 200 ml beaker, adding 5 g of water at normal temperature, stirring rapidly with a glass rod, and measuring the viscosity of POP.

TABLE 3

Embodiments of the Preparation of High-active POP

| Embodiments | SP7 | SP8 | SP9 | SP10 | SP11 | SP12 | Comparative Embodiment 3 |
|---|---|---|---|---|---|---|---|
| Polyol C (g) | 270 | 270 | 270 | 270 | 270 | 270 | 270 |
| Type of Dispersant | B1 | B2 | B3 | B4 | B5 | B6 | Dispersant E |
| Amount of Dispersant (g) | 22.7 | 22.7 | 22.7 | 22.7 | 22.7 | 22.7 | 22.7 |
| Isopropanol (g) | 40 | 40 | 40 | 40 | 40 | 40 | 40 |
| Styrene (g) | 140 | 140 | 140 | 140 | 140 | 140 | 140 |
| Acrylonitrile (g) | 70 | 70 | 70 | 70 | 70 | 70 | 70 |
| AIBN (g) | 3 | 3 | 3 | 3 | 3 | 3 | 3 |
| Solid Content (%) | 40.6 | 40.5 | 41.2 | 40.6 | 41.4 | 40.8 | 40.5 |
| Viscosity (cps/25° C.) | 7110 | 6690 | 6360 | 6940 | 6100 | 8430 | 7610 |
| Particles | A Few and Large | Fine | Fine | Large | Fine | Large | Large |
| Color and Luster | White | White | White | Milky White | White | Milky White | Milky White |
| Viscosity after Water-Solution (cps/25° C.) | 8620 | 8270 | 8820 | 8560 | 7450 | 10750 | 10340 |

Note: water-solution test: taking 100 g of POP in a 200 ml beaker, adding 5 g of water at normal temperature, stirring rapidly with a glass rod, and measuring the viscosity of POP.

It can be seen from the above comparative analysis that the common POP and high-active POP prepared by the preparation method of the invention have not only a relatively low viscosity, but also fine particles, high whiteness and good water solubility.

It is obvious that the described embodiments are merely particular embodiments of the invention rather than all embodiments. All other embodiments made by those of ordinary skill in the art based on the embodiments of the invention without creative efforts shall all fall within the protection scope of the invention.

What is claimed is:

1. A preparation method of the dispersant comprising the steps of synthesizing a basic polyether polyol, reacting a cyclic dicarboxylic anhydride to the basic polyether polyol, then reacting the product with a compound comprising a polymerizable double or triple bond, and then subsequently capping the product with an epoxy compound to obtain the dispersant;

Subsequently, preparing the polymer polyol at a temperature of 100-130° C. by reacting a basic polyol with styrene and acrylonitrile in the presence of a polymerization initiator and said dispersant and an optional chain transfer agent;

Wherein the basic polyether polyol is a polyether polyol with a functionality of 3 to 8, comprising propylene oxide and ethylene oxide blocks, wherein the content of ethylene oxide is 0-50 wt % and the molecular weight thereof is 5000-20000.

2. The dispersant for polymer polyol and the preparation method of polymer polyol according to claim 1, wherein the initiator of polyether polyol is glycerin, the catalyst used for the synthesis of polyether polyol is a potassium hydroxide or bimetallic catalyst.

3. The dispersant for polymer polyol and the preparation method of polymer polyol according to claim 1, wherein the capping epoxy olefin is selected from one of propylene oxide, ethylene oxide, and butylene oxide.

4. The dispersant for polymer polyol and the preparation method of polymer polyol according to claim 1, wherein the polymerization initiator is an azo compound or a peroxide; the azo compound is azodiisobutyronitrile (AIBN), and the weight of the polymerization initiator is 0.3-0.7% of the total weight.

5. The dispersant for polymer polyol and the preparation method of polymer polyol according to claim 1, wherein the chain transfer agent is isopropanol and the weight of the chain transfer agent is 1-10% of the total weight.

6. The dispersant for polymer polyol and the preparation method of polymer polyol according to claim 1, wherein the vinyl monomer is styrene and acrylonitrile with a weight ratio of 80:20-20:80, and the weight of the vinyl monomer is 30-60% of the total weight.

* * * * *